United States Patent
Dhiman et al.

(10) Patent No.: US 8,355,320 B1
(45) Date of Patent: Jan. 15, 2013

(54) SYSTEMS AND METHODS FOR PROVIDING PRESENCE INFORMATION

(75) Inventors: Aaron Kumar Dhiman, Hyattsville, MD (US); Manish Sharma, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 914 days.

(21) Appl. No.: 11/472,356

(22) Filed: Jun. 22, 2006

(51) Int. Cl.
*H04J 1/16* (2006.01)
*H04L 12/28* (2006.01)
*G06F 15/16* (2006.01)

(52) U.S. Cl. ............... 370/229; 370/395.2; 709/227
(58) Field of Classification Search ............ 370/401
See application file for complete search history.

(56) References Cited

U.S. PATENT DOCUMENTS

| | | | |
|---|---|---|---|
| 6,687,732 B1* | 2/2004 | Bector et al. | 709/200 |
| 7,225,257 B2* | 5/2007 | Aoike et al. | 709/225 |
| 7,730,156 B1* | 6/2010 | Jethwa et al. | 709/217 |
| 2002/0075303 A1* | 6/2002 | Thompson et al. | 345/751 |
| 2002/0157019 A1* | 10/2002 | Kadyk et al. | 713/201 |
| 2004/0122896 A1* | 6/2004 | Gourraud | 709/204 |
| 2004/0267645 A1* | 12/2004 | Pollari | 705/34 |
| 2005/0141479 A1* | 6/2005 | Ozugur et al. | 370/351 |
| 2005/0198545 A1* | 9/2005 | Wieck et al. | 713/323 |
| 2006/0026290 A1* | 2/2006 | Pulito et al. | 709/227 |
| 2006/0114882 A1* | 6/2006 | Mills | 370/352 |
| 2006/0149811 A1* | 7/2006 | Bennett et al. | 709/203 |
| 2006/0167978 A1* | 7/2006 | Ozugur et al. | 709/203 |
| 2006/0167998 A1* | 7/2006 | Yoshiuchi et al. | 709/204 |

\* cited by examiner

*Primary Examiner* — Faruk Hamza
*Assistant Examiner* — Cassandra Decker

(57) ABSTRACT

Systems and methods for communicating presence information are provided. A communication station establishes a persistent connection with a proxy server and a temporary connection with a presence server. The temporary connection is established independent of the proxy server. The communication station provides and obtains presence information directly from the presence server over the temporary connection. After providing or obtaining information, the communication station terminates the temporary connection, while still maintaining the persistent connection with the proxy server.

16 Claims, 4 Drawing Sheets

SYSTEMS AND METHODS FOR PROVIDING PRESENCE INFORMATION

BACKGROUND OF THE INVENTION

As communications technology continues to advance, various features are being provided. One feature is presence information. Presence information identifies the status of a communication station or application. Presence information is commonly provided by computer-based instant messaging programs in so-called "buddy lists".

SUMMARY OF THE INVENTION

FIG. 1 is a block diagram illustrating an exemplary network for providing presence information. The network includes communication station 105, a network address translation (NAT) device/firewall 110, communication network 115, NAT/firewall 120, edge proxy 125 and presence server 130. In the network of FIG. 1 communication station 105 establishes a persistent connection with edge proxy 125. The persistent connection is necessary in order to provide incoming call alerts to communication station 105 due to NAT/firewall 110.

When communication station 105 updates its' own presence information or obtains presence information regarding another communication station, the communication station 105 sends a request to edge proxy 125. Edge proxy 125 then establishes a temporary connection with presence server 130 to update the presence information or obtain presence information regarding other communication stations. Scalability issues arise when all information communicated between communication station 105 and presence server 130 passes through edge proxy 125. Specifically, in order to avoid overload conditions, and in turn denial of service, at edge proxy 125, edge proxy 125 must be scaled to handle the additional traffic. The additional capacity required by edge proxy 125 results in increased costs.

The present invention overcomes the above-identified and other deficiencies of conventional systems by establishing a persistent connection with the edge proxy and a temporary connection with the presence server where the temporary connection is formed independent of the edge proxy. Forming the connections between communication stations and a presence server independent of an edge proxy reduces the load on the edge proxy, and the need for increasing capacity of the edge proxy.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
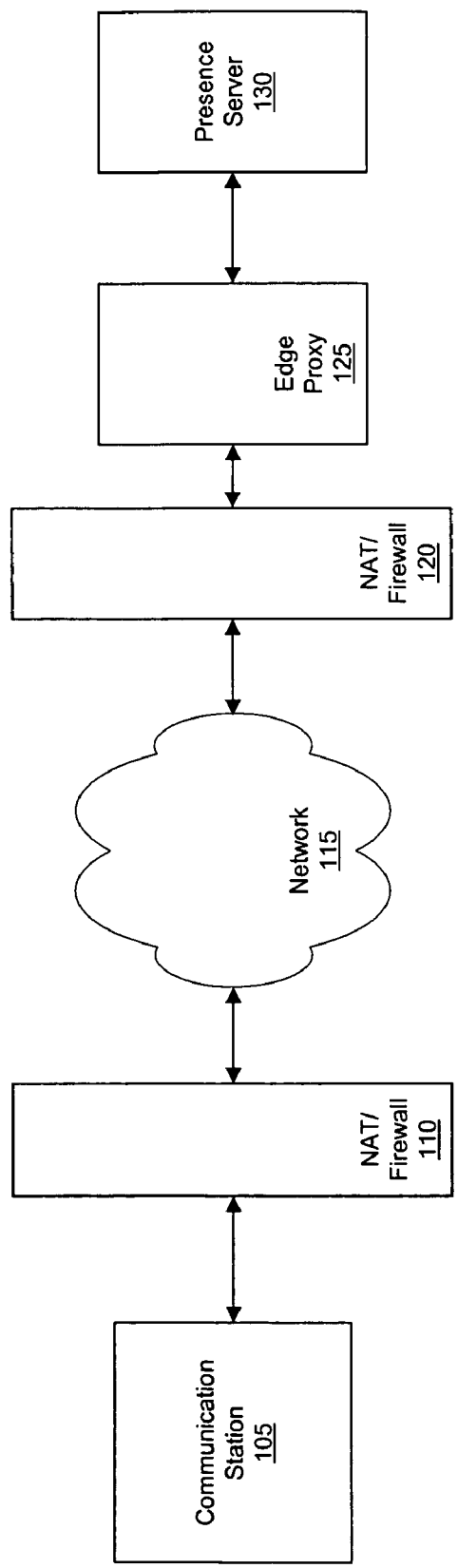
FIG. 1 is a block diagram illustrating an exemplary network for providing presence information.
Figure 2:
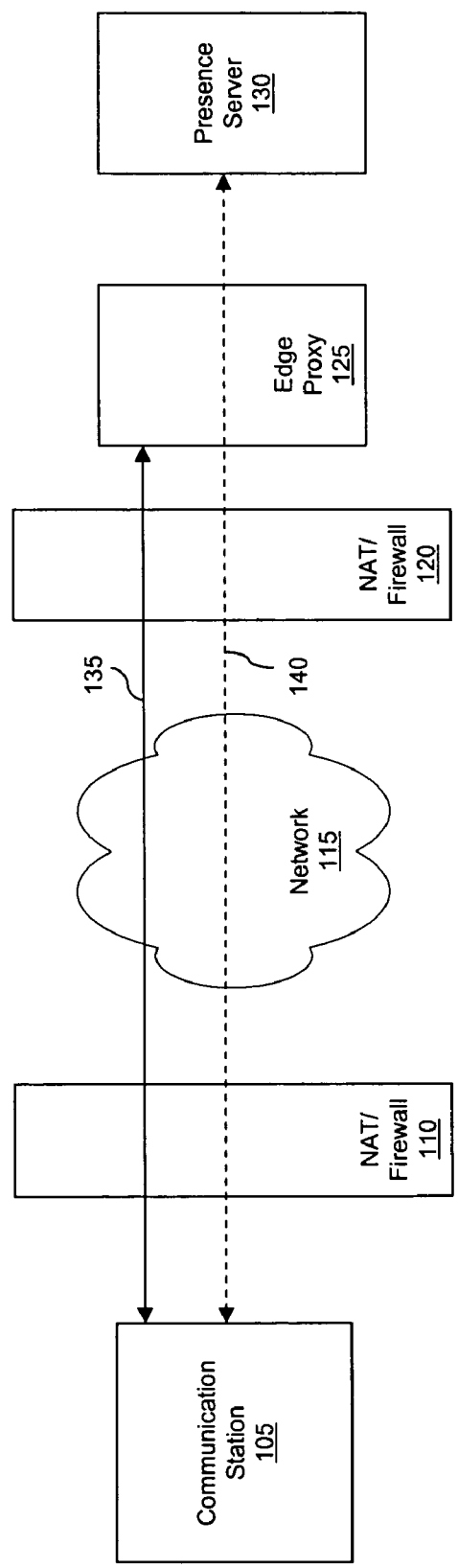
FIG. 2 is a block diagram illustrating an exemplary network for providing presence information in accordance with the present invention.

FIG. 2 is a block diagram illustrating an exemplary network for providing presence information in accordance with the present invention. The elements in FIG. 2 with like reference numerals to those in FIG. 1 operate in a similar manner, except as described below. In particular, in FIG. 1 all communications between communication station 105 and presence server 130 passes through edge proxy 125. In contrast, in FIG. 2 communication station 105 has a persistent connection 135 with edge proxy 125 and a temporary connection 140 with presence server 135. The operation of the present invention will be described in more detail below in connection with the signaling flow diagrams of FIGS. 3 and 4.

Figure 3:
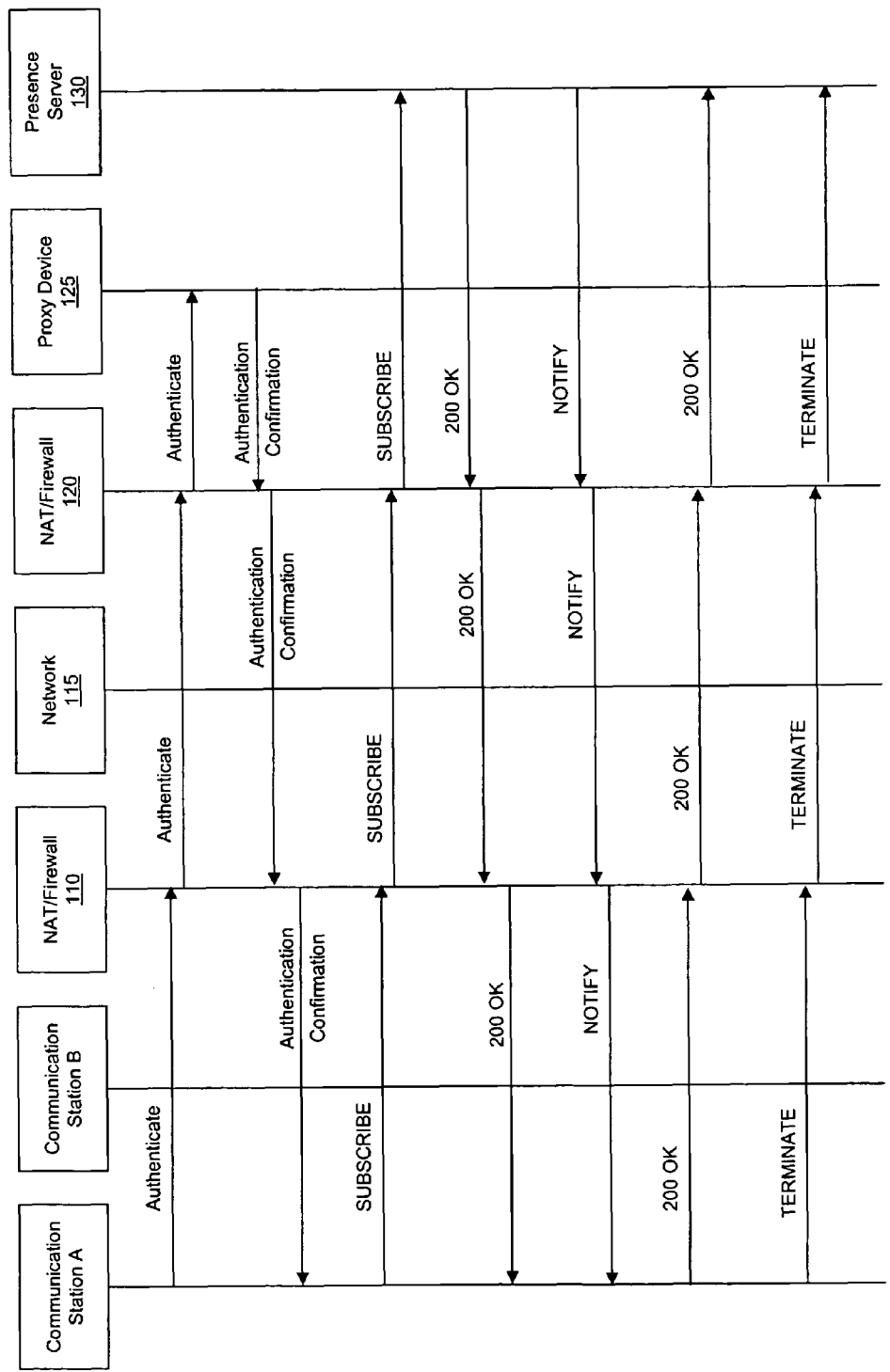
FIG. 3 is a signaling flow diagram of an exemplary method for requesting presence information in accordance with the present invention.

FIG. 3 is a signaling flow diagram of an exemplary method for requesting presence information in accordance with the present invention. Specifically, FIG. 3 illustrates an exemplary method for communication station A to obtain presence information regarding communication station B. Initially, communication station A establishes a persistent connection with proxy device 125, and exchanges authentication information over the persistent connection. After being authenticated, communication station A then registers an interest in presence information regarding communication station B over a temporary connection. In accordance with exemplary embodiments of the present invention the temporary connection is a hyper text transfer protocol secure sockets (HTTPS/HTTP) connection. In FIG. 3 communication station A registers interest by sending a session initiation protocol (SIP) SUBSCRIBE message, and presence server 130 confirms the registration interest by sending a 200 OK message. Presence server 130 then sends presence information regarding communication station B over the temporary connection in a SIP NOTIFY message, and communication station A confirms receipt of the message using a 200 OK message. Communication station A then terminates the temporary connection by sending a TERMINATE message.

Removing presence interest information, for example using a SIP UNSUBSCRIBE message, and/or Black/White List updates would be performed in a similar manner to that described above in connection with FIG. 3. Moreover, in the method described above presence server 130 can provide authentication services to communication station 105, which would use a "cookie" mechanism to allow for session-level authentication. In this case, communication station 105 would not need to perform the authentication with edge proxy 125.

Figure 4:
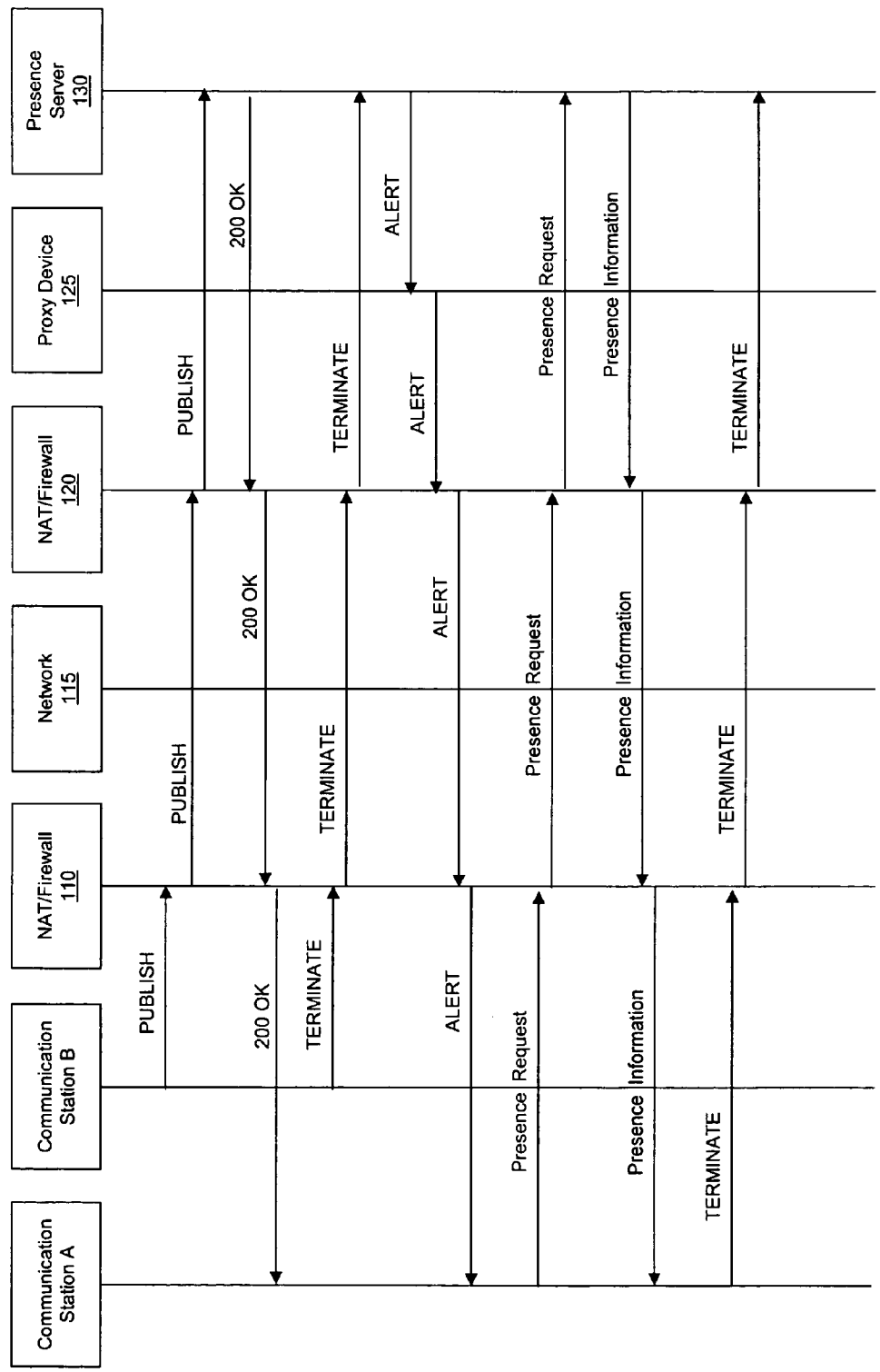
FIG. 4 is a signaling flow diagram of an exemplary method for receiving updated presence information in accordance with the present invention.

FIG. 4 is a signaling flow diagram of an exemplary method for receiving updated presence information in accordance with the present invention. When the presence status of communication station B changes, the communication station updates its presence information by sending a SIP PUBLISH message over a temporary connection to presence server 130, which confirms receipt of the information using a 200 OK message. Communication station B then terminates the temporary connection. Presence server 130 recognizes that communication station A subscribes to presence information regarding communication station B and sends an ALERT message to communication station A via proxy device 125 over the persistent connection between proxy device 125 and communication station A. Because of NAT/Firewall 110, this message is sent over the persistent connection so that communication station A establishes a temporary connection with presence server 130.

Communication station A then establishes a temporary connection with presence server 130 and sends a presence request message over the temporary connection. Presence server 130 responds with the presence information, for example in a SIP NOTIFY message, and communication station A then terminates the temporary connection.

Although not illustrated in FIG. 4, authentication can be added to the HTTP/HTTPS transactions, and may or may not include session "cookies". In FIG. 4 the HTTP/HTTPS transactions include all of the messages exchanged over the persistent connection except for the ALERT message. The ALERT message is sent over a persistent transport layer security (TLS) connection.

Although exemplary embodiments have been described in connection with the use of particular message, the present invention can employ other types of messages. Specifically, if a protocol other than SIP is employed for presence information, the messages of the other protocol can be employed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communicating presence information, the method comprising the acts of:
    initiating, by a communication station, a persistent packet-switched connection with an edge proxy device to provide incoming alerts to the communication station;
    establishing, by the communication station after the initiation of the persistent packet-switched connection, a first temporary packet-switched connection with a presence server contemporaneous with the persistent packet-switched connection, wherein the first temporary packet-switched connection is established independent of the edge proxy device;
    registering, by the communication station, with the presence server over the first temporary packet-switched connection, an interest in presence information of another communication station;
    receiving, by the communication station, an alert message sent from the presence server via the edge proxy device over the persistent packet-switched connection indicating that updated presence information of the another communication station is available;
    transmitting, by the communication station over a second temporary packet-switched connection contemporaneous with the persistent packet-switched connection, a request message for the updated presence information to the presence server in response to the alert message; and
    receiving, by the communication station over the second temporary packet-switched connection, the updated presence information from the presence server.

2. The method of claim 1, further comprising the act of:
    authenticating the communication station through the presence server over the first temporary packet-switched connection.

3. The method of claim 1, wherein the act of registering comprises the act of:
    sending a session initiation protocol (SIP) SUBSCRIBE message.

4. The method of claim 1, wherein after registering the interest in the presence information, the communication station terminates the first temporary packet-switched connection with the presence server.

5. The method of claim 1, further comprising the act of:
    sending, by the communication station to the presence server, presence information over the first temporary packet-switched connection.

6. The method of claim 1, wherein the presence information is sent in a session initiation protocol (SIP) PUBLISH message.

7. The method of claim 5, further comprising the act of:
    terminating, by the communication station, the first temporary packet-switched connection after sending the presence information.

8. The method of claim 1, wherein the first temporary packet-switched connection is a hyper text transfer protocol secure sockets (HTTPS) connection.

9. A method for communicating presence information, the method comprising the acts of:
    establishing, by an edge proxy device at the request of a communication station, a persistent packet-switched connection with the communication station to provide incoming alerts to the communication station;
    establishing, by a presence server after the establishment of the persistent packet-switched connection, a first temporary packet-switched connection with the communication station contemporaneous with the persistent packet-switched connection, wherein the first temporary packet-switched connection is established independent of the edge proxy device;
    registering, by the communication station, with the presence server over the first temporary packet-switched connection, an interest in presence information of another communication station;
    receiving, by the communication station, an alert message sent from the presence server via the edge proxy device over the persistent packet-switched connection indicating that updated presence information of the another communication station is available;
    transmitting, by the communication station over a second temporary packet-switched connection contemporaneous with the persistent packet-switched connection, a request message for the updated presence information to the presence server in response to the alert message; and
    receiving, by the communication station over the second temporary packet-switched connection, the updated presence information from the presence server.

10. The method of claim 9, further comprising the act of:
    authenticating the communication station through the presence server over the first temporary packet-switched connection.

11. The method of claim 9, wherein the act of registration of interest is in a session initiation protocol (SIP) SUBSCRIBE message.

12. The method of claim 9, wherein the first temporary packet-switched connection is terminated after receiving the registration of interest.

13. The method of claim 9, further comprising the act of:
    receiving, by the presence server from the communication station, presence information over the first temporary packet-switched connection.

14. The method of claim 9, wherein the presence information is received in a session initiation protocol (SIP) PUBLISH message.

15. The method of claim 13, wherein the first temporary packet-switched connection is terminated after receiving the presence information.

16. The method of claim 9, wherein the first temporary packet-switched connection is a hyper text transfer protocol secure sockets (HTTPS) connection.

* * * * *